US010996445B2

(12) United States Patent
Miyagishima

(10) Patent No.: US 10,996,445 B2
(45) Date of Patent: May 4, 2021

(54) IMAGING LENS AND IMAGING APPARATUS

(71) Applicant: FUJIFILM Corporation, Tokyo (JP)

(72) Inventor: Shunsuke Miyagishima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 188 days.

(21) Appl. No.: 16/444,793

(22) Filed: Jun. 18, 2019

(65) Prior Publication Data
US 2019/0391368 A1 Dec. 26, 2019

(30) Foreign Application Priority Data

Jun. 25, 2018 (JP) .............................. JP2018-120296

(51) Int. Cl.
*G02B 13/00* (2006.01)
*G02B 9/64* (2006.01)
(52) U.S. Cl.
CPC ........... *G02B 13/0045* (2013.01); *G02B 9/64* (2013.01)
(58) Field of Classification Search
CPC ..... G02B 13/0045; G02B 9/64; G02B 15/177
See application file for complete search history.

(56) References Cited

U.S. PATENT DOCUMENTS

2013/0162886 A1   6/2013   Morooka et al.
2015/0309393 A1  10/2015   Kuzuhara et al.

FOREIGN PATENT DOCUMENTS

| JP | 2013-029658 A | 2/2013 |
| JP | 2013-125213 A | 6/2013 |
| JP | 2014-142604 A | 8/2014 |

*Primary Examiner* — Wen Huang
(74) *Attorney, Agent, or Firm* — Studebaker & Brackett PC

(57) ABSTRACT

The imaging lens consists of, in order from the object side, a positive first lens group, a stop, a positive second lens group, and a negative third lens group. Lenses arranged first and second from the object side are both negative single lenses having convex surfaces toward the object side. The second lens group includes a cemented lens in which a negative lens and a positive lens are cemented. During focusing, only the second lens group moves. Assuming that focal lengths of the first lens group and the second lens group are f1 and f2, respectively, the imaging lens satisfies $0.7 < f1/f2 < 2$.

16 Claims, 9 Drawing Sheets

EXAMPLE 1

EXAMPLE 2

EXAMPLE 3

EXAMPLE 4

EXAMPLE 5

EXAMPLE 3

EXAMPLE 4

EXAMPLE 5

ID # IMAGING LENS AND IMAGING APPARATUS

CROSS-REFERENCE TO RELATED APPLICATIONS

The present application claims priority under 35 U.S.C. § 119 to Japanese Patent Application No. 2018-120296, filed on Jun. 25, 2018. The above application is hereby expressly incorporated by reference, in its entirety, into the present application.

BACKGROUND OF THE INVENTION

1. Field of the Invention

The present invention relates to an imaging lens and an imaging apparatus.

2. Description of the Related Art

In the related art, as an imaging lens applicable to an imaging apparatus such as a digital camera, a lens system has been well known which consists of three groups as disclosed in JP2014-142604A, JP2013-125213A and JP2013-029658A. JP2014-142604A, JP2013-125213A, and JP2013-029658A disclose inner-focus type lens system.

SUMMARY OF THE INVENTION

Recently, with the miniaturization of the imaging apparatus, the imaging lens mounted on the imaging apparatus is required to be miniaturized. Along with miniaturization, higher performance is also required, and the required level is increasing year by year.

In the lens system disclosed in JP2014-142604A, distortion is not sufficiently corrected. In the lens system disclosed in JP2013-125213A, distortion and lateral chromatic aberration are not sufficiently corrected. In the lens system disclosed in JP2013-029658A, further improvement is desirable for correction of distortion and lateral chromatic aberration.

The present invention has been made in consideration of the above-mentioned situation. An object to be solved by an embodiment of the present invention is to provide an imaging lens which is miniaturized and has a favorable performance by sufficiently correcting distortion and lateral chromatic aberration, and an imaging apparatus comprising the imaging lens.

Specific measures to solve the above-mentioned object includes the following aspects. An imaging lens according to a first aspect consists of, in order from an object side to an image side, a first lens group having a positive refractive power, a stop, a second lens group having a positive refractive power, and a third lens group having a negative refractive power, in which lenses arranged first and second from the object side in the first lens group are both single lenses having convex surfaces toward the object side and negative refractive powers, the first lens group includes at least one positive lens, the second lens group includes a cemented lens in which one negative lens and one positive lens are cemented and the second lens group only moves along an optical axis during focusing from an object at infinity to a closest object, and assuming that a focal length of the first lens group is f1 and a focal length of the second lens group is f2, Conditional Expression (1) is satisfied.

$$0.7 < f1/f2 < 2 \quad (1)$$

The imaging lens according to a second aspect may be implemented by the imaging lens according to the first aspect, in which, assuming that a partial dispersion ratio between a g line and a F line of a positive lens having the lowest refractive index in the first lens group is θgfPL, a partial dispersion ratio between the g line and the F line of a negative lens having the lowest refractive index in the first lens group is θgfNL, an Abbe number based on a d line of the positive lens having the lowest refractive index in the first lens group is vPL, and an Abbe number based on a d line of the negative lens having the lowest refractive index in the first lens group is vNL, Conditional Expression (2) is satisfied.

$$-0.015 < (\theta gfPL - \theta gfNL)/(vPL - vNL) < 0 \quad (2)$$

The imaging lens according to a third aspect may be implemented by the imaging lens according to the first aspect or the second aspect, in which, assuming that a partial dispersion ratio between a g line and a F line of a positive lens in the first lens group having the highest refractive index is θgfPH, and a partial dispersion ratio between the g line and the F line of a negative lens in the first lens group having the highest refractive index is θgfNH, Conditional Expression (3) is satisfied.

$$-0.05 < \theta gfPH - \theta gfNH < 0 \quad (3)$$

The imaging lens according to a fourth aspect may be implemented by the imaging lens according to any one of the first to third aspects, in which, assuming that, in a state of focusing on an object at infinity, a back focus of the imaging lens at an air equivalent distance is Bf and a sum of a distance on an optical axis from a lens surface closest to the object side to a lens surface closest to the image side and Bf is TTL, Conditional Expression (4) is satisfied.

$$2.5 < TTL/Bf < 5.5 \quad (4)$$

The imaging lens according to a fifth aspect may be implemented by the imaging lens according to any one of the first to fourth aspects, in which the lenses in the first lens group arranged first and second from the object side are both meniscus lenses, and a single lens having a positive refractive power is arranged on the image side of the meniscus lens in the first lens group arranged second from the object side to be continuous from the meniscus lens, and in which, in the first lens group a cemented lens, in which at least one negative lens and at least one positive lens are cemented and a lens surface closest to the image side is convex, is arranged closest to the image side.

The imaging lens according to a sixth aspect may be implemented by the imaging lens according to any one of the first to fifth aspects, in which the second lens group includes, continuously in order from the object side to the image side, the cemented lens in which a biconcave lens and a biconvex lens are cemented in order from the object side and a biconvex single lens.

The imaging lens according to a seventh aspect may be implemented by the imaging lens according to any one of the first to sixth aspects, in which the third lens group includes at least one negative lens and at least one positive lens.

The imaging lens according to an eighth aspect may be implemented by the imaging lens according to any one of the first to seventh aspects, in which a lens surface in the third lens group closest to the object side is a concave surface and a lens surface in the third lens group closest to the image side is a convex surface.

The imaging lens according to a ninth aspect may be implemented by the imaging lens according to any one of the first to eighth aspects, in which the first lens group consists of six or seven lenses.

The imaging lens according to a tenth aspect may be implemented by the imaging lens according to any one of the first to ninth aspects, in which the second lens group consists of three lenses.

The imaging lens according to an eleventh aspect may be implemented by the imaging lens according to any one of the first to tenth aspects, in which the third lens group consists of two or three lenses.

The imaging lens according to a twelfth aspect may be implemented by the imaging lens according to the first aspect, in which Conditional Expression (1-1) is satisfied.

$$1 < f1/f2 < 1.8 \quad (1\text{-}1)$$

The imaging lens according to a thirteenth aspect may be implemented by the imaging lens according to the second aspect, in which Conditional Expression (2-1) is satisfied.

$$-0.01 < (\theta gfPL - \theta gfNL)/(\nu PL - \nu NL) < 0 \quad (2\text{-}1)$$

The imaging lens according to a fourteenth aspect may be implemented by the imaging lens according to the third aspect, in which Conditional Expression (3-1) is satisfied.

$$-0.04 < \theta gfPH - \theta gfNH < 0 \quad (3\text{-}1)$$

The imaging lens according to a fifteenth aspect may be implemented by the imaging lens according to the fourth aspect, in which Conditional Expression (4-1) is satisfied.

$$3 < TTL/Bf < 4.8 \quad (4\text{-}1)$$

An imaging apparatus according to a sixteenth aspect comprises the imaging lens according to any one of the first to fifteenth aspects.

In the present specification, it should be noted that the terms "consisting of ~" and "consists of ~" mean that, in addition to the components listed, a lens that substantially has no refractive powers, an optical element, which are not the lens, such as a stop, a filter, and a cover glass, and a mechanism part such as a lens flange, a lens barrel, an imaging element, and a camera shaking correction mechanism may be included.

In the present specification, it should be noted that "~ group having a positive refractive power" means that the group has a positive refractive power as a whole. Likewise, it should be also noted that "~ group having a negative refractive power" means that the group has a negative refractive power as a whole. "Lens having a positive refractive power" and "positive lens" are synonymous. "Lens having a negative refractive power" and "negative lens" are synonymous. The "lens group" is not limited to a composition consisting of a plurality of lenses, and may be a composition of only one lens.

"Single lens" means one lens that is not cemented with any other lens. However, a compound aspheric lens (a lens which is integrally composed of a spherical lens and a film having an aspheric shape formed on the spherical lens, and functions as one aspheric lens as a whole) is not be considered as a cemented lens, and is treated as a single lens. Regarding the lens including the aspheric surface, the sign of the refractive power and the surface shape of the lens surface will be considered in the paraxial region unless otherwise specified.

The "focal length" used in the conditional expression is the paraxial focal length. "Back focus" used in the conditional expression is the air equivalent distance on the optical axis from the lens surface closest to the image side to the focal position on the image side. Values used in the conditional expression are values in the case of using the d line as a reference, other than the partial dispersion ratio. It should be noted that the partial dispersion ratio θgF between the g line and the F line of a certain lens is defined by θgF=(Ng−NF)/(NF−NC), where Ng, NF, and NC are the refractive indices of the lens at the g line, the F line, and the C line, respectively. The "d line", "C line", "F line", and "g line" described in this specification are bright lines, the wavelength of the d line is 587.56 nm (nanometer), the wavelength of the C line is 656.27 nm (nanometer), the wavelength of the F line is 486.13 nm (nanometer), and the wavelength of the g line is 435.84 nm (nanometer).

According to the embodiments of the present invention, an imaging lens which is miniaturized and has a favorable performance by sufficiently correcting distortion and lateral chromatic aberration, and an imaging apparatus comprising the imaging lens can be provided.

DESCRIPTION OF THE PREFERRED EMBODIMENTS

Figure 1:
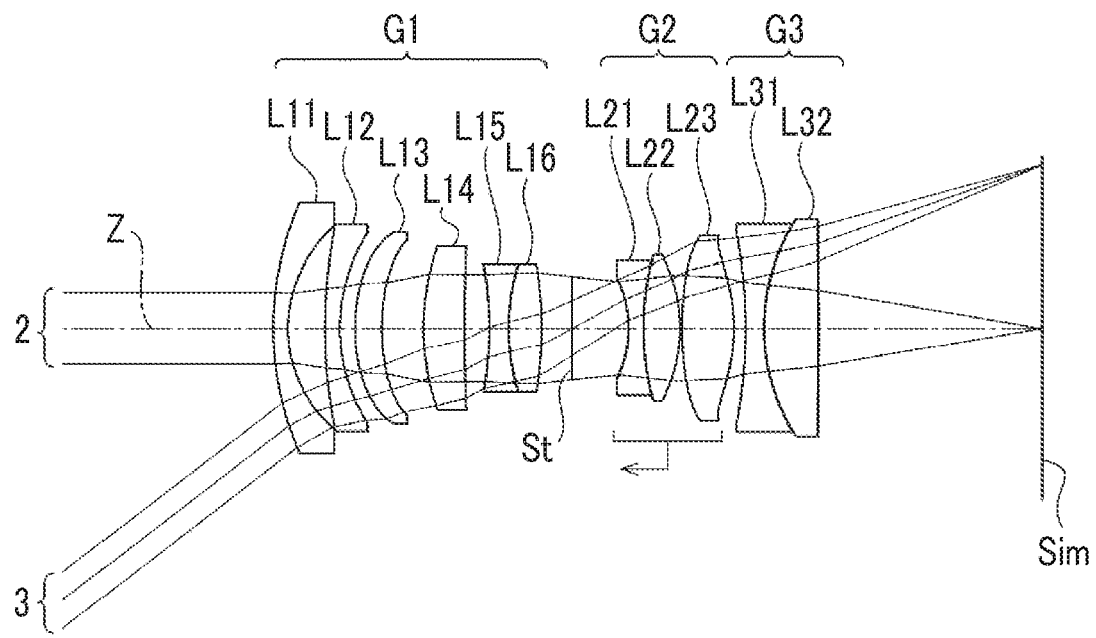
FIG. 1 is a cross-sectional view illustrating a configuration of an imaging lens (imaging lens of Example 1 of the present invention) according to an embodiment of the present invention.

Hereinafter, embodiments of an imaging lens of the present invention will be described with reference to drawings. FIG. 1 is a cross-sectional view illustrating a configuration of an imaging lens according to an embodiment of the present invention. The example shown in FIG. 1 corresponds to an imaging lens of Example 1 to be described later. In FIG. 1, the left side is the object side and the right side is the image side, and a state in which an object at infinity is in focus is shown. In addition, on-axis rays 2 and rays 3 with the maximum angle of view are also shown as rays in FIG. 1.

This imaging lens of the embodiment of the present invention consists of, in order from the object side to the image side along an optical axis Z, a first lens group G1 that has a positive refractive power, an aperture stop St, a second lens group G2 that has a positive refractive power; and a third lens group G3 that has a negative refractive power. In this way, the arrangement, in each lens group, of positive, positive, and negative refractive powers in order from the object side to the image side is advantageous in shortening the total length of the lens system. The aperture stop St shown in FIG. 1 indicates the position on the optical axis Z.

In the imaging lens shown in FIG. 1 as an example, the first lens group G1 consists of six lenses L11 to L16 in order from the object side to the image side, the second lens group G2 consists of three lenses L21 to L23 in order from the object side to the image side, and the third lens group G3 consists of two lenses L31 to L32 in order from the object side to the image side. However, as shown in Examples to be described later, the number of lenses of which each lens group consists can be different from the number shown in FIG. 1.

The imaging lens is configured such that, during focusing from the object at infinity to the closest object, only the second lens group G2 is moved along the optical axis Z, and the first lens group G1, the aperture stop St and the third lens group G3 remain fixed with respect to an image plane Sim. That is, a lens group (hereinafter referred to as a focus group) which moves during focusing is the second lens group G2. With the configuration in which only the second lens group G2 moves during focusing, it is possible to reduce the size and weight of a focusing unit to be moved during focusing, which results in an advantage in reducing the load of a drive system driving the focus group and speeding up focusing. With the configuration of fixing the first lens group G1 and the third lens group G3 during focusing, it is possible to obtain dust protection and waterproof effects.

In the example shown in FIG. 1, the configuration in which the second lens group G2 moves to the object side during focusing from the object at infinity to the closest object is employed. The arrow directed to the left under the second lens group G2 shown in FIG. 1 indicates that the second lens group G2 is the focus group that moves to the object side during focusing from the object at infinity to the closest object.

In the imaging lens, an aperture stop St is disposed between the first lens group G1 and the second lens group G2. By disposing the aperture stop St just before the focus group on the object side, it is possible to suppress the height of the light beam incident onto the focus group, and thus it is possible to reduce a diameter of the lens of the focus group, which results in an advantage in reducing the load of the drive system driving the focus group and speeding up focusing.

The first and second lenses from the object side of the first lens group G1 are each single lenses having a negative refractive power with a convex surface toward the object side. Further, the first lens group G1 is composed to include at least one positive lens. Distortion can be easily corrected by continuously arranging two single lenses having the convex surface toward the object side and having a negative refractive power closest to the object side, and the size of the imaging lens in the radial direction can be easily reduced while securing the angle of view. The cooperation of the two negative lenses with the positive lens makes it possible to satisfactorily correct chromatic aberration and distortion.

The first lens group G1 may be configured as described above, and may consist of six lenses or seven lenses as a whole. In the case described above, the first lens group G1 can consist of the necessary number of lenses in order to favorably correct distortion and chromatic aberration without hindering miniaturization. In a lens system consisting of three lens groups and having the aperture stop St disposed between the first lens group G1 and the second lens group G2, by setting the number of lenses in the first lens group G1 to six or seven, it is easy to locate the aperture stop St is in the vicinity of the middle of the lens system, and thus it is easy to improve the symmetry between the object side and the image side of the aperture stop St, which results in an advantage in correcting distortion.

It is preferable that both the first and second negative lenses from the object side of the first lens group G1 are meniscus lenses, and in this case, it is easy to correct distortion. Further, it is preferable that a single lens having a positive refractive power is arranged continuously with the second meniscus lens on the image side of the second meniscus lens from the object side of the first lens group G1, and that a cemented lens having at least one negative lens and at least one positive lens cemented together is arranged closest to the image side of the first lens group G1 and the cemented lens has a convex lens surface closest to the image side. In this case, it is possible to suppress occurrence of chromatic aberration in the first lens group G1 by composing the first lens group G1 with the combination of the positive lens and the negative lens, and to suppress fluctuation in chromatic aberration in a case where the second lens group G2 moves during focusing. In addition, it is possible to obtain an effect of correcting distortion and astigmatism by setting the surface of the first lens group G1 which is closest to the image side to be a convex surface. It is preferable that, on the image side of the second meniscus lens from the object side of the first lens group G1, at least two single lenses having a positive refractive power are arranged continuously from the second meniscus lens, and in this case, it is possible to satisfactorily suppress occurrence of chromatic aberration in the first lens group G1.

Specifically, for example, the first lens group G1 can consist of, in order from the object side to the image side, two negative meniscus lens having convex surfaces toward the object side, two or three single lenses having convex surfaces toward the object side and having a positive refractive power, and a cemented lens in which a biconcave lens and a biconvex lens are cemented in order from the object side. Alternatively, the first lens group G1 can consist of, in order from the object side to the image side, three negative meniscus lens having convex surfaces toward the object side, a single lens having a convex surface toward the object side and having a positive refractive power, and a cemented lens in which a biconcave lens and a biconvex lens are cemented in order from the object side.

The second lens group G2 is composed of a cemented lens in which a negative lens and a positive lens are cemented with each other. Since the second lens group G2 has one negative lens and one positive lens, chromatic aberration of the second lens group G2 alone can be suitably suppressed, and an effect of suppressing distortion is also obtained.

The second lens group G2 may be composed as described above, and may consist of three lenses as a whole. The above mentioned composition makes it possible to satisfactorily correct various aberrations including chromatic aberration while achieving miniaturization of the second lens group G2, which is the focus group.

It is preferable that the second lens group G2 consists of, continuously in order from the object side to the image side, a cemented lens in which a biconcave lens and a biconvex lens are cemented with each other in order from the object side, and a biconvex single lens. In this case, it is possible to obtain the effect of correcting field curvature and astigmatism by the combination of the biconcave lens and the biconvex lens, and it is also possible to correct chromatic aberration in the second lens group G2. In addition, it is possible to obtain an effect of correcting spherical aberration and distortion with the biconvex single lens having a positive refractive power.

In order to achieve miniaturization and favorable optical performance at the same time, it is preferable that the second lens group G2 consists of, in order from the object side to the image side, the cemented lens in which the biconcave lens and the biconvex lens are cemented in order from the object side, and the biconvex single lens.

The third lens group G3 may be composed to consist of a total of two or three lenses. The above mentioned composition is advantageous in favorably correcting various aberrations while achieving miniaturization.

It is preferable that the third lens group G3 is composed of at least one negative lens and at least one positive lens. By composing the third lens group G3 of both the negative lens and the positive lens, it is possible to, in the lens group closest to the image plane Sim, obtain the effect of suppressing occurrence of chromatic aberration in the lens group alone, which is advantageous in suppressing chromatic aberration.

It is preferable that the lens surface of the third lens group G3 closest to the object side is a concave surface and the lens surface of the third lens group G3 closest to the image side is a convex surface. By setting the lens surface of the third lens group G3 closest to the object side to be concave, it is possible to obtain the effect of correcting field curvature. By setting the lens surface of the third lens group G3 closest to the image side to be convex, it is possible to suppress occurrence of astigmatism.

For example, the third lens group G3 can be composed of the cemented lens in which the biconcave lens and the biconvex lens are cemented with each other in order from the object side. Alternatively, the third lens group G3 can be composed of the cemented lens in which two positive meniscus lenses having convex surfaces toward the image side are cemented, and the negative meniscus lens having the convex surface toward the image side. Yet alternatively, the third lens group G3 can be composed of the cemented lens in which the biconcave lens, the biconvex lens, and the negative meniscus lens having a convex surface toward the image side are cemented in order from the object side.

Next, configurations relating to conditional expressions will be described. The imaging lens of the present disclosure satisfies following Conditional Expression (1) assuming that the focal length of the first lens group G1 is f1 and the focal length of the second lens group G2 is f2. By not allowing the value of f1/f2 of Conditional Expression (1) to be equal to or lower than the lower limit, it is possible to suppress the refractive power of the first lens group G1 from becoming relatively too strong, and thus it is possible to suppress the amount of occurrence of distortion. By not allowing the value of f1/f2 of Conditional Expression (1) to be equal to or larger than the upper limit, the refractive power of the second lens group G2 is prevented from becoming excessively strong, and thus it is easy to suppress lateral chromatic aberration in the second lens group G2 alone. Since the second lens group G2 is the focus group, it is possible to suppress the amount of fluctuation in lateral chromatic aberration during focusing by suppressing lateral chromatic aberration in the second lens group G2 alone. Furthermore, if following Conditional Expression (1-1) is satisfied, better characteristics can be obtained.

$$0.7 < f1/f2 < 2 \qquad (1)$$

$$1 < f1/f2 < 1.8 \qquad (1\text{-}1)$$

Assuming that a partial dispersion ratio between a g line and an F line of the positive lens having the lowest refractive index in the first lens group G1 is $\theta gfPL$, a partial dispersion ratio between the g line and the F line of the negative lens having the lowest refractive index in the first lens group G1 is $\theta gfNL$, an Abbe number based on a d line of the positive lens having the lowest refractive index in the first lens group G1 is $vPL$, and an Abbe number base on the d line of the negative lens having the lowest refractive index in the first lens group G1 is $vNL$, it is preferable to satisfy following Conditional Expression (2). By not allowing the value of $\theta gfPL - \theta gfNL$ of Conditional Eexpression (2) to be equal to or lower than the lower limit, the difference between $\theta gfPL$ and $\theta gfNL$ does not become too large, and the difference between $vPL$ and $vNL$ does not become too small. As a result, it is easy to obtain the secondary achromatic effect sufficiently, which makes it possible to satisfactorily correct secondary lateral chromatic aberration. By not allowing the value of $\theta gfPL - \theta gfNL$ of Conditional Expression (2) to be equal to or greater than the upper limit, the difference between $\theta gfPL$ and $\theta gfNL$ does not become too small, and materials of low dispersion cannot be combined at the time of combining a positive lens and a negative lens. As a result, it is easy to select a combination of materials effective for correcting secondary lateral chromatic aberration. Furthermore, if following Conditional Expression (2-1) is satisfied, better characteristics can be obtained.

$$-0.015 < (\theta gfPL - \theta gfNL)/(vPL - vNL) < 0 \qquad (2)$$

$$-0.01 < (\theta gfPL - \theta gfNL)/(vPL - vNL) < 0 \qquad (2\text{-}1)$$

Assuming that the partial dispersion ratio between a g line and a F line of the positive lens having the highest refractive index in the first lens group G1 is $\theta gfPH$ and the partial dispersion ratio between the g line and the F line of the negative lens having the highest refractive index in the first lens group G1 is $\theta gfNH$, it is preferable to satisfy following Conditional Expression (3). In general, dispersion of optical materials having a high refractive index tends to be large. By not allowing the value of $\theta gfPH - \theta gfNH$ of Conditional Expression (3) to be equal to or lower than the lower limit, it is possible to reduce the second order lateral chromatic aberration generated by the positive lens having the high refractive index and the negative lens having the high refractive index. By not allowing the value of $\theta gfPH - \theta gfNH$ of Conditional Expression (3) to be equal to or greater than the upper limit, the refractive power of the negative lens in the first lens group G1 can be secured, which can contribute to miniaturization of the imaging lens in the radial direction. Furthermore, if following Conditional Expression (3-1) is satisfied, better characteristics can be obtained.

$$-0.05 < \theta gfPH - \theta gfNH < 0 \qquad (3)$$

$$-0.04 < \theta gfPH - \theta gfNH < 0 \qquad (3\text{-}1)$$

Assuming that, in the state focused on an object at infinity, the back focus of the imaging lens at the air equivalent distance is Bf, the sum of the distance on the optical axis from the lens surface closest to the object side to the lens surface closest to image side and Bf is TTL, it is preferable to satisfy following Conditional Expression (4). By not allowing the value of TTL/Bf of Conditional Expression (4) to be equal to or lower than the lower limit, the refractive power of the lens group closest to the image side is prevented from becoming excessively weak, and thus it is easy to correct astigmatism. By not allowing the value of TTL/Bf of Conditional Expression (4) to be equal to or greater than the upper limit, it is possible to reduce the total length of the lens system. Furthermore, if following Conditional Expression (4-1) is satisfied, better characteristics can be obtained.

$$2.5 < TTL/Bf < 5.5 \quad (4)$$

$$3 < TTL/Bf < 4.8 \quad (4\text{-}1)$$

The above-mentioned preferred compositions and available compositions may be optional combinations, and it is preferable to selectively adopt the compositions in accordance with required specification. According to the technique of the present disclosure, it is possible to implement an imaging lens that is miniaturized and has good performance by sufficiently correcting distortion and lateral chromatic aberration.

Next, numerical examples of the imaging lens of the embodiment of the present invention will be described.

EXAMPLE 1

A cross section that illustrates a lens composition of an imaging lens of Example 1 is illustrated in FIG. 1, and a composition and a method thereof illustrated in the drawing is as described above. Therefore, repeated description is partially omitted herein. The imaging lens of Example 1 consists of, in order from the object side to the image side: a first lens group G1 that has a positive refractive power; a aperture stop St, a second lens group G2 that has a positive refractive power; and a third lens group G3 that has a negative refractive power. During focusing from the object at infinity to the closest object, only the second lens group G2 moves to the object side along the optical axis Z. The above is the outline of the imaging lens of Example 1.

The first lens group G1 consists of six lenses L11 to L16 in order from the object side to the image side, the second lens group G2 consists of three lenses L21 to L23 in order from the object side to the image side, and the third lens group G3 consists of two lenses L31 to L32 in order from the object side to the image side.

Table 1 shows basic lens data of the imaging lens of Example 1, Table 2 shows specification, and Table 3 shows aspheric coefficients thereof. In Table 1, the column of Sn shows surface numbers, where the surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows refractive indices of the respective components at the d line, the column νd shows Abbe numbers of the respective components based on the d line, and the column θgF shows partial dispersion ratio of respective components between the g line and the F line.

In Table 1, the reference sign of a radius of curvature of the shape that is convex toward the object side is set to be positive, and the reference sign of the radius of curvature of the shape that is convex toward the image side is set to be negative. In Table 1, the aperture stop St is also illustrated, in a place of a surface number of a surface corresponding to the aperture stop St, the surface number and a term of (St) are noted. A value at the bottom place of D in Table 1 indicates a distance between the image plane Sim and the surface closest to the image side in the table.

In Table 2, the focal length f of the imaging lens, the back focus Bf in terms of the air equivalent distance, the F number FNo., and the maximum total angle of view 2ω are based on the d line. (°) in the place of 2ω indicates that the unit thereof is a degree.

In Table 1, the reference sign * is attached to surface numbers of aspheric surfaces, and numerical values of the paraxial radius of curvature are written into the column of the radius of curvature of the aspheric surface. In Table 3, the column of Sn shows the surface number of the aspheric surface, and the column of KA and Am (m=3, 4, 5, . . . ) Shows the numerical values of the aspheric coefficients for each aspheric surface. The "E±n" (n: an integer) in numerical values of the aspheric coefficients of Table 3 indicates "×10$^{\pm n}$". KA and Am are the aspheric coefficients in the aspheric expression expressed by the following expression.

$Zd = C \times h^2 / \{1 + (1 - KA \times C^2 \times h^2)^{1/2}\} + \Sigma Am \times h^m$, where Zd is an aspheric depth (from a point on the aspherical surface of the height h, the length of the perpendicular drawn down to the plane perpendicular to the optical axis with which the aspherical apex contacts), h is a height (the distance from the optical axis to the lens surface), C is an inverse of the paraxial radius of curvature, KA, Am are aspheric coefficients, and Σ in an aspheric expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | νd | θgF |
|---|---|---|---|---|---|
| 1 | 53.60207 | 2.400 | 1.95906 | 17.47 | 0.65993 |
| 2 | 23.11175 | 6.080 | | | |
| 3 | 91.66686 | 2.400 | 1.43875 | 94.66 | 0.53402 |
| 4 | 30.59561 | 2.500 | | | |
| *5 | 33.38914 | 4.380 | 1.58313 | 59.42 | 0.54109 |
| *6 | 39.47382 | 6.800 | | | |
| 7 | 42.48762 | 6.750 | 2.00272 | 19.32 | 0.64514 |
| 8 | 439.97431 | 4.002 | | | |
| 9 | −60.29184 | 3.160 | 1.59551 | 39.23 | 0.58053 |
| 10 | 37.80471 | 5.400 | 1.87070 | 40.73 | 0.56825 |
| 11 | −66.30143 | 4.740 | | | |
| 12(St) | ∞ | 9.300 | | | |
| 13 | −20.13418 | 2.400 | 1.71736 | 29.51 | 0.60259 |
| 14 | 46.79875 | 6.010 | 1.62041 | 60.37 | 0.54240 |
| 15 | −27.26968 | 0.300 | | | |
| *16 | 58.32567 | 8.500 | 1.58313 | 59.42 | 0.54109 |
| *17 | −29.83305 | 1.890 | | | |
| 18 | −91.02783 | 3.030 | 1.67300 | 38.15 | 0.57545 |
| 19 | 34.75436 | 8.910 | 1.55032 | 75.50 | 0.54001 |
| 20 | −1020.11005 | 36.564 | | | |

TABLE 2

Example 1

| | |
|---|---|
| f | 35.166 |
| Bf | 36.564 |
| FNo. | 2.90 |
| 2ω (°) | 80.0 |

TABLE 3

Example 1

| | Sn | | | |
|---|---|---|---|---|
| | 5 | 6 | 16 | 17 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.9108902E−05 | 9.4867414E−06 | 8.9815326E−07 | 1.8727691E−05 |
| A5 | −6.5696360E−07 | 9.3518429E−07 | 5.5800197E−08 | −1.4860859E−06 |
| A6 | 6.6447140E−08 | −7.6229283E−08 | −4.2740512E−09 | 2.0728310E−07 |
| A7 | 9.5686101E−10 | 4.8103767E−09 | 4.2285581E−09 | −9.1907505E−09 |
| A8 | −9.0535875E−11 | 1.9980153E−11 | −9.3166217E−11 | −3.1722782E−10 |
| A9 | −7.2528545E−12 | −4.2630287E−12 | −6.4390945E−12 | 6.2125798E−11 |
| A10 | 2.0308526E−13 | −1.5833153E−13 | 7.4649790E−13 | −1.2012253E−12 |
| A11 | 2.2079810E−14 | −2.6918090E−15 | −6.8190266E−15 | −7.2502082E−14 |
| A12 | 1.2975447E−15 | 1.2200426E−15 | −4.8698015E−16 | 4.2494414E−15 |
| A13 | 9.1405098E−17 | 6.9243203E−17 | −5.5859434E−18 | −3.2100895E−17 |
| A14 | −2.2287682E−18 | 1.3961612E−17 | −5.2429182E−18 | 2.6679930E−18 |
| A15 | −5.6941327E−19 | −7.7610347E−20 | 2.9262877E−19 | −1.5465349E−19 |
| A16 | 1.7124989E−20 | −1.2543219E−21 | 4.6954749E−20 | −1.1659948E−20 |
| A17 | −7.5930697E−22 | −1.2558045E−21 | −7.4301837E−22 | −5.0538731E−22 |
| A18 | −4.0627671E−23 | −3.0196828E−22 | −6.6576677E−23 | 4.1137382E−23 |
| A19 | 2.1453597E−24 | −2.0306777E−23 | −9.0990051E−25 | −1.9390471E−24 |
| A20 | 3.0957365E−25 | 2.7576274E−24 | 6.3096388E−26 | 5.2842225E−25 |

Figure 6:
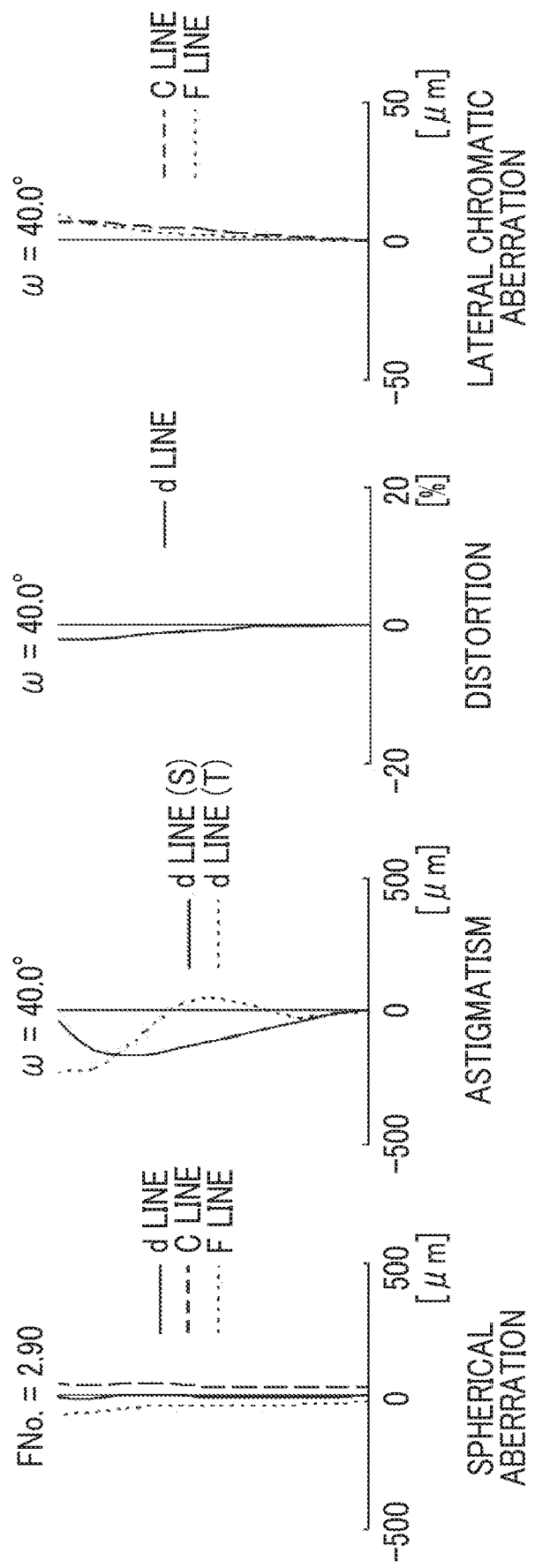
FIG. 6 is a diagram of aberrations of the imaging lens of Example 1 of the present invention.

FIG. 6 shows aberration diagrams in a state where an object at infinity is brought into focus through the imaging lens of Example 1. FIG. 6 shows spherical aberration, astigmatism, distortion, and lateral chromatic aberration in order from the left side. In the spherical aberration diagram, aberrations at the d line, the c line, and the F line are respectively indicated by the solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, 'FNo.' indicates an F number. In the other aberration diagrams, ω indicates a half angle of view.

The symbols, the meanings, the description method, and the illustration method of each data relating to Example 1 are the same in the following Examples unless otherwise specified, and so descriptions thereof will not be repeated below.

EXAMPLE 2

Figure 2:
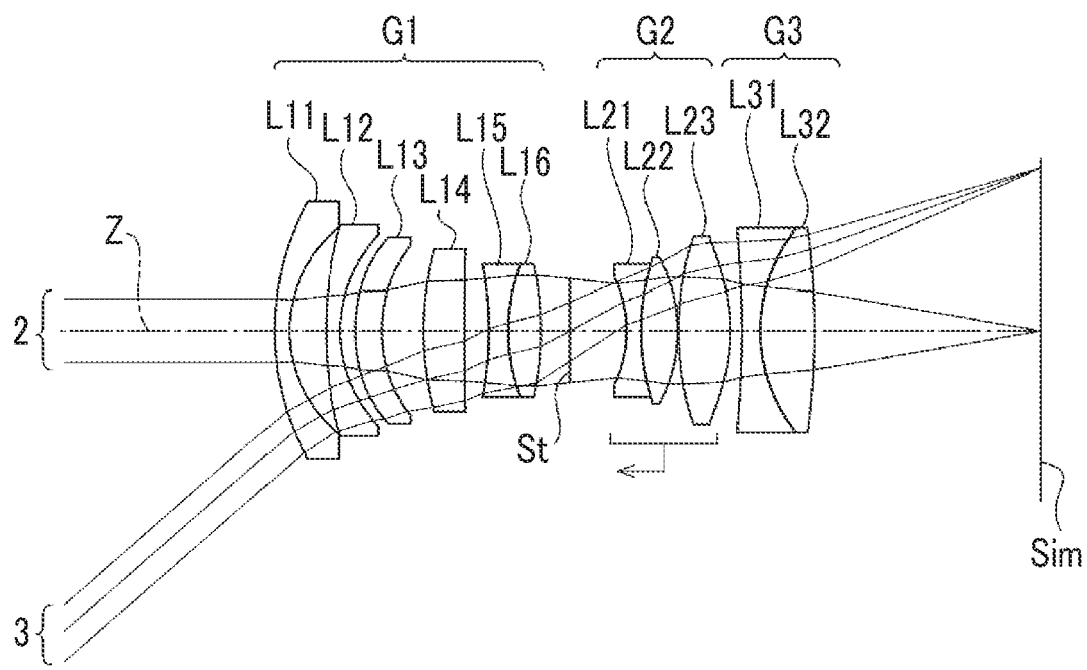
FIG. 2 is a cross-sectional view illustrating a configuration of an imaging lens of Example 2 of the present invention.
Figure 7:
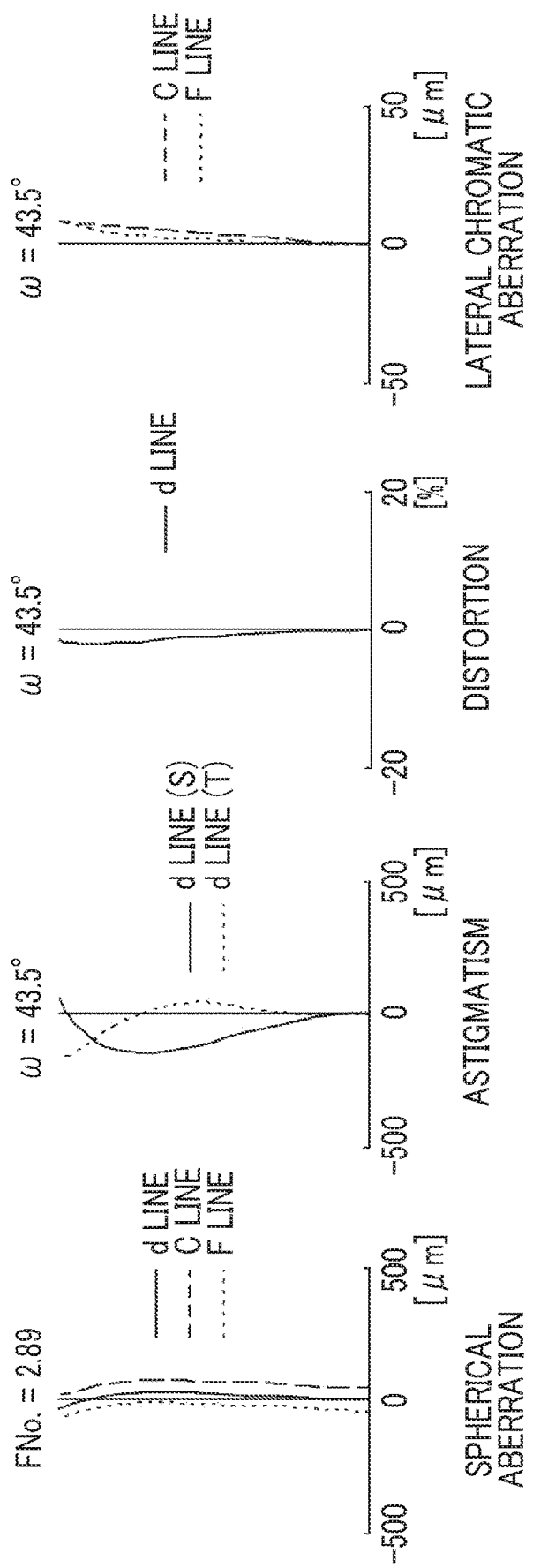
FIG. 7 is a diagram of aberrations of the imaging lens of Example 2 of the present invention.

FIG. 2 is a cross-sectional view illustrating a configuration of an imaging lens of Example 2. The imaging lens of Example 2 has the same composition as the outline of the imaging lens of Example 1. The first lens group G1 consists of six lenses L11 to L16 in order from the object side to the image side, the second lens group G2 consists of three lenses L21 to L23 in order from the object side to the image side, and the third lens group G3 consists of two lenses L31 to L32 in order from the object side to the image side. Table 4 shows basic lens data of the imaging lens of Example 2, Table 5 shows specification, Table 6 shows aspheric coefficients, and FIG. 7 illustrates aberration diagrams in a state where the object at infinity is in focus.

TABLE 4

Example 2

| Sn | R | D | Nd | vd | θgF |
|---|---|---|---|---|---|
| 1 | 46.21544 | 2.400 | 1.95906 | 17.47 | 0.65993 |
| 2 | 22.48267 | 6.080 | | | |
| 3 | 68.12574 | 2.400 | 1.43875 | 94.66 | 0.53402 |
| 4 | 23.61816 | 2.500 | | | |
| *5 | 30.54618 | 4.380 | 1.51633 | 64.06 | 0.53345 |
| *6 | 26.32893 | 6.800 | | | |
| 7 | 53.39407 | 6.750 | 2.00272 | 19.32 | 0.64514 |
| 8 | 601.46536 | 3.980 | | | |
| 9 | −61.43212 | 3.160 | 1.51601 | 52.00 | 0.55740 |
| 10 | 31.70612 | 5.400 | 1.84986 | 43.01 | 0.56400 |
| 11 | −53.51531 | 4.740 | | | |
| 12(St) | ∞ | 9.300 | | | |
| 13 | −21.51854 | 2.400 | 1.78208 | 31.34 | 0.59806 |
| 14 | 40.16636 | 6.010 | 1.62940 | 60.02 | 0.54308 |
| 15 | −26.48334 | 0.300 | | | |
| *16 | 52.03990 | 8.500 | 1.65600 | 58.70 | 0.54261 |
| *17 | −31.43384 | 1.890 | | | |
| 18 | −171.32717 | 3.030 | 1.88105 | 39.90 | 0.57077 |
| 19 | 28.05098 | 8.910 | 1.53775 | 74.70 | 0.53936 |
| 20 | −124.02658 | 37.098 | | | |

TABLE 5

| Example 2 | |
|---|---|
| f | 30.920 |
| Bf | 37.098 |
| FNo. | 2.89 |
| 2ω (°) | 87.0 |

TABLE 6

| | Example 2 | | | |
|---|---|---|---|---|
| | Sn | | | |
| | 5 | 6 | 16 | 17 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.9014797E−05 | 7.6176496E−06 | −2.6466641E−06 | 1.3551722E−05 |
| A5 | −5.9421072E−07 | 9.8018206E−07 | −8.0409416E−08 | −1.4015593E−06 |
| A6 | 4.9684173E−08 | −9.7914281E−08 | −8.5371920E−09 | 1.8724574E−07 |
| A7 | 2.5214329E−10 | 2.4319357E−09 | 3.6787058E−09 | −9.3290472E−09 |
| A8 | −1.1686112E−10 | 5.9389584E−11 | −1.7231605E−10 | −3.4673335E−10 |
| A9 | −5.5848781E−12 | −8.1924273E−13 | −7.9807095E−12 | 6.0143505E−11 |
| A10 | 2.9118290E−13 | −1.2178521E−13 | 9.9131597E−13 | −1.1889684E−12 |
| A11 | 2.1650700E−14 | −1.1220021E−14 | 5.6321148E−15 | −8.5436952E−14 |
| A12 | 7.0664040E−16 | 1.0165240E−15 | −1.1800992E−15 | 2.9485627E−15 |
| A13 | 4.8286888E−17 | 7.1409136E−17 | −7.2313883E−17 | −5.6780550E−17 |
| A14 | −1.7384363E−18 | 7.7942779E−18 | −3.2478263E−18 | 9.1786546E−18 |
| A15 | −5.9889227E−19 | −1.4749388E−19 | −5.9633300E−21 | −9.0264248E−22 |
| A16 | 2.2009790E−20 | −2.5113238E−20 | 4.1926990E−20 | −1.3637548E−20 |
| A17 | −6.2820794E−22 | −1.1579122E−21 | −1.5866729E−22 | −7.5905868E−22 |
| A18 | −1.5722003E−23 | −1.5212148E−22 | −3.1350111E−23 | 1.9868023E−23 |
| A19 | 2.6111362E−25 | −6.1989434E−24 | −4.1067009E−24 | −2.6633728E−24 |
| A20 | 1.4693120E−25 | 1.2174183E−24 | 1.8187812E−25 | 2.5235835E−25 |

EXAMPLE 3

Figure 3:
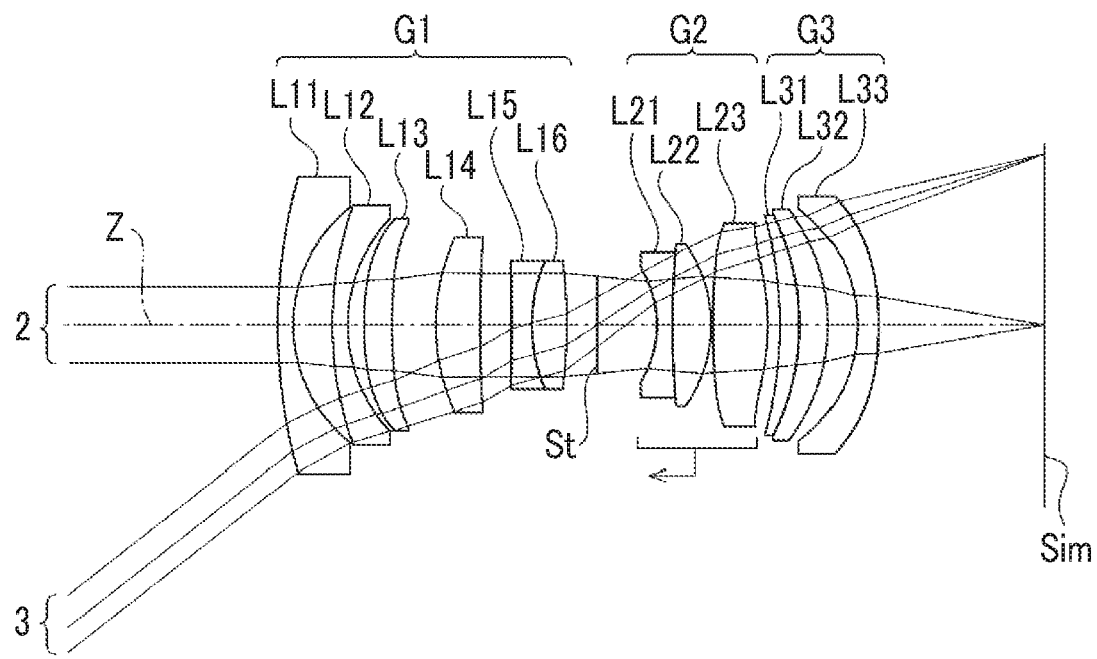
FIG. 3 is a cross-sectional view illustrating a configuration of an imaging lens of Example 3 of the present invention.
Figure 8:
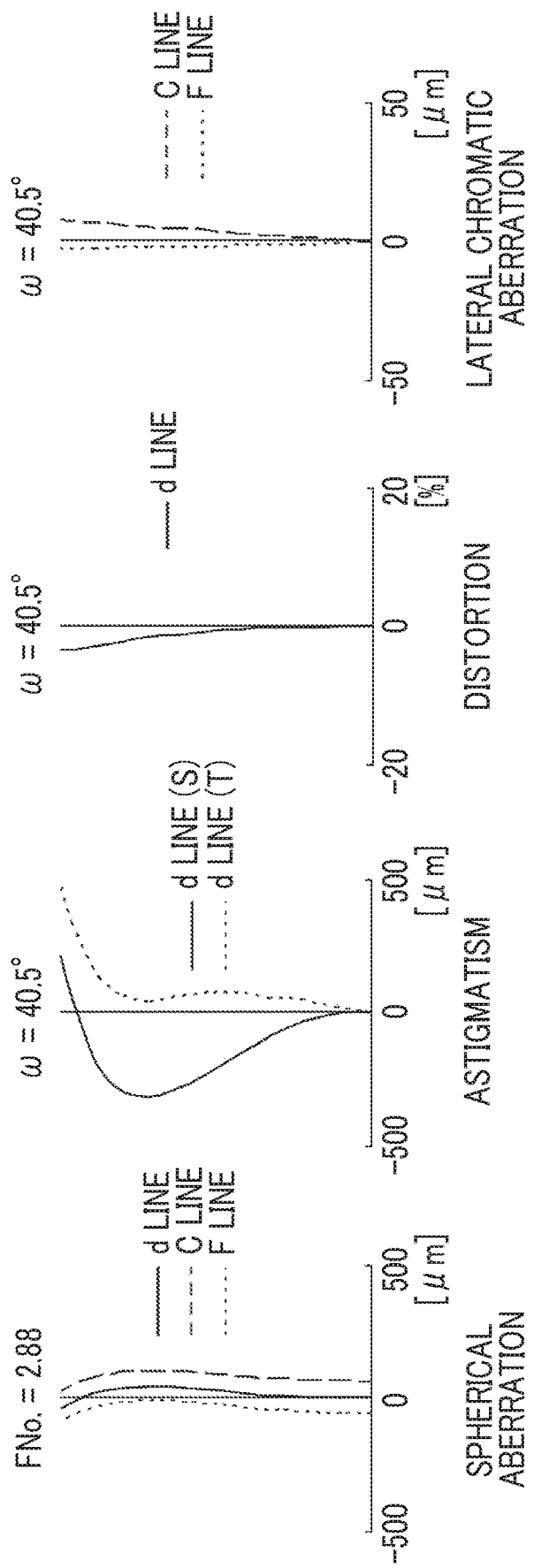
FIG. 8 is a diagram of aberrations of the imaging lens of Example 3 of the present invention.

FIG. 3 is a cross-sectional view illustrating a configuration of an imaging lens of Example 3. The imaging lens of Example 3 has the same composition as the outline of the imaging lens of Example 1. The first lens group G1 consists of six lenses L11 to L16 in order from the object side to the image side, the second lens group G2 consists of three lenses L21 to L23 in order from the object side to the image side, and the third lens group G3 consists of three lenses L31 to L33 in order from the object side to the image side. Table 7 shows basic lens data of the imaging lens of Example 3, Table 8 shows specification, Table 9 shows aspheric coefficients, and FIG. 8 illustrates aberration diagrams in a state where the object at infinity is in focus.

TABLE 7

| Example 3 | | | | | |
|---|---|---|---|---|---|
| Sn | R | D | Nd | νd | θgF |
| 1 | 90.84269 | 2.400 | 1.60311 | 60.64 | 0.54148 |
| 2 | 24.63430 | 6.080 | | | |
| 3 | 57.99304 | 2.400 | 1.49700 | 81.54 | 0.53748 |
| 4 | 25.51564 | 2.500 | | | |
| *5 | 50.41088 | 4.380 | 1.77250 | 49.50 | 0.55193 |
| *6 | 100.97491 | 6.800 | | | |
| 7 | 34.34135 | 6.750 | 1.62004 | 36.26 | 0.58800 |
| 8 | 245.59532 | 4.880 | | | |
| 9 | −562.71389 | 3.160 | 1.83918 | 23.86 | 0.62236 |
| 10 | 26.98954 | 5.400 | 1.91100 | 35.22 | 0.58360 |
| 11 | −87.05847 | 4.740 | | | |
| 12(St) | ∞ | 9.300 | | | |

TABLE 7-continued

| Example 3 | | | | | |
|---|---|---|---|---|---|
| Sn | R | D | Nd | νd | θgF |
| 13 | −17.63481 | 2.410 | 1.58010 | 39.99 | 0.57937 |
| 14 | 145.72513 | 6.000 | 1.61240 | 60.68 | 0.54297 |
| 15 | −23.19562 | 0.300 | | | |
| *16 | 141.55364 | 8.500 | 1.59743 | 61.25 | 0.54260 |
| *17 | −39.47489 | 1.890 | | | |
| 18 | −67.07551 | 3.030 | 1.49700 | 81.54 | 0.53748 |
| 19 | −40.23950 | 4.410 | 1.51601 | 77.54 | 0.53783 |
| 20 | −31.20465 | 4.500 | | | |
| *21 | −25.56246 | 3.300 | 1.88835 | 35.81 | 0.58197 |
| *22 | −47.20706 | 25.635 | | | |

TABLE 8

| Example 3 | |
|---|---|
| f | 34.993 |
| Bf | 25.635 |
| FNo. | 2.88 |
| 2ω (°) | 81.0 |

TABLE 9

| | Example 3 | | | |
|---|---|---|---|---|
| | Sn | | | |
| | 5 | 6 | 16 | 17 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.5532851E−05 | 1.0901524E−05 | 3.4285205E−06 | 1.6399576E−05 |
| A5 | 3.7709937E−07 | 6.9473961E−07 | −1.8227487E−07 | −1.5155513E−06 |
| A6 | −1.6468475E−08 | −3.7465592E−08 | 8.4872401E−09 | 1.9009201E−07 |
| A7 | 5.4046370E−10 | 8.7081108E−10 | 3.9049988E−09 | −7.6974405E−09 |
| A8 | 3.4215026E−11 | −2.1697174E−11 | −1.4518178E−10 | −3.1227443E−10 |
| A9 | −1.2682966E−12 | 1.0152644E−12 | −7.6786768E−12 | 5.9389439E−11 |
| A10 | −7.8015884E−14 | −1.5159066E−13 | 1.0084892E−12 | −1.2468000E−12 |
| A11 | 6.0538338E−15 | 5.5855065E−15 | 8.5450534E−15 | −8.9382169E−14 |
| A12 | −4.0280349E−16 | 2.5447934E−16 | −1.2689952E−15 | 3.0529931E−15 |
| A13 | 1.4030175E−17 | 1.2722712E−17 | −6.2636154E−17 | −2.1546153E−17 |
| A14 | 3.4734365E−19 | −8.2729445E−19 | −3.0759692E−18 | 9.3338545E−18 |
| A15 | 3.2264423E−20 | 6.2759357E−20 | 9.8269663E−20 | 1.1084839E−20 |
| A16 | 4.1773837E−21 | −7.8801371E−21 | 1.1062090E−20 | −1.1347597E−20 |
| A17 | −1.4213676E−22 | 6.1842121E−22 | 1.4913222E−23 | −6.4362752E−22 |
| A18 | −7.6111867E−24 | 1.4596390E−23 | −2.9724289E−24 | 9.1032485E−25 |
| A19 | −5.1414474E−25 | −2.3019190E−24 | 3.1696942E−25 | −2.9576309E−24 |
| A20 | 4.8239498E−26 | 6.0854924E−26 | −3.2929111E−26 | 1.8498003E−25 |

| | Sn | |
|---|---|---|
| | 21 | 22 |
| KA | 1.0000000E+00 | 1.0000000E+00 |
| A4 | −8.0665889E−06 | −1.0155214E−05 |
| A6 | −7.1170622E−09 | −7.7909140E−09 |
| A8 | −1.1325883E−11 | 1.0274282E−11 |
| A10 | 8.0257666E−14 | −2.9389999E−15 |

EXAMPLE 4

Figure 4:
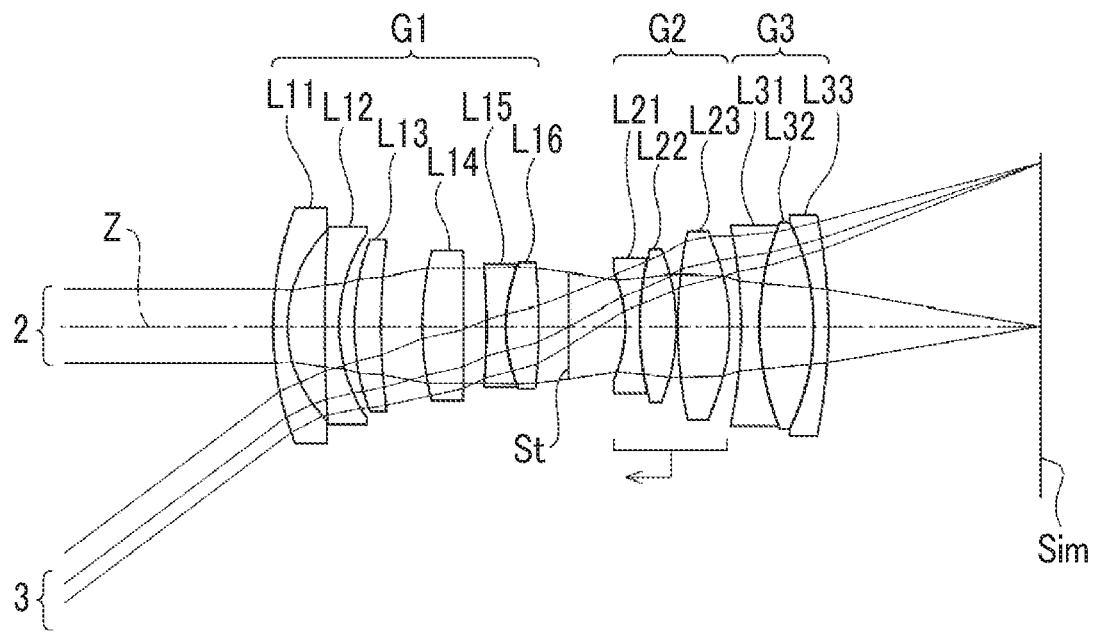
FIG. 4 is a cross-sectional view illustrating a configuration of an imaging lens of Example 4 of the present invention.
Figure 9:
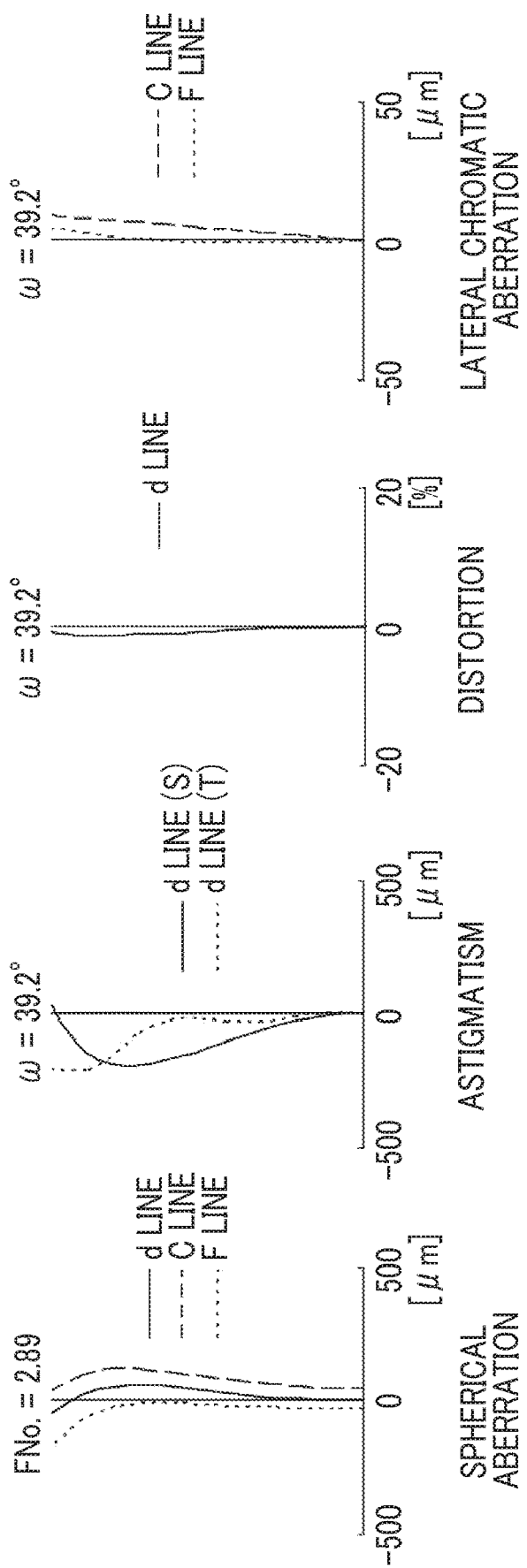
FIG. 9 is a diagram of aberrations of the imaging lens of Example 4 of the present invention.

FIG. 4 is a cross-sectional view illustrating a configuration of an imaging lens of Example 4. The imaging lens of Example 4 has the same composition as the outline of the imaging lens of Example 1. The first lens group G1 consists of six lenses L11 to L16 in order from the object side to the image side, the second lens group G2 consists of three lenses L21 to L23 in order from the object side to the image side, and the third lens group G3 consists of three lenses L31 to L33 in order from the object side to the image side. Table 10 shows basic lens data of the imaging lens of Example 4, Table 11 shows specification, Table 12 shows aspheric coefficients, and FIG. 9 illustrates aberration diagrams in a state where the object at infinity is in focus.

TABLE 10

| | Example 4 | | | | |
|---|---|---|---|---|---|
| Sn | R | D | Nd | νd | θgF |
| 1 | 55.17500 | 2.400 | 1.95906 | 17.47 | 0.65993 |
| 2 | 22.90474 | 6.080 | | | |
| 3 | 231.31623 | 2.400 | 1.49700 | 81.54 | 0.53748 |
| 4 | 28.75249 | 2.500 | | | |
| *5 | 44.35642 | 4.380 | 1.72903 | 54.04 | 0.54474 |
| *6 | 100.97491 | 6.800 | | | |
| 7 | 50.93158 | 6.750 | 2.00272 | 19.32 | 0.64514 |
| 8 | −2018.33962 | 3.680 | | | |
| 9 | −108.54215 | 3.160 | 1.51601 | 52.00 | 0.55740 |
| 10 | 28.04288 | 5.400 | 1.79359 | 48.64 | 0.55350 |
| 11 | −98.54730 | 4.740 | | | |
| 12(St) | ∞ | 9.300 | | | |

TABLE 10-continued

| | Example 4 | | | | |
|---|---|---|---|---|---|
| Sn | R | D | Nd | νd | θgF |
| 13 | −22.23490 | 2.400 | 1.82404 | 23.80 | 0.61995 |
| 14 | 49.35168 | 6.010 | 1.66849 | 58.08 | 0.54272 |
| 15 | −34.99728 | 0.300 | | | |
| *16 | 79.28733 | 8.500 | 1.85399 | 37.89 | 0.57704 |
| *17 | −31.63396 | 1.890 | | | |
| 18 | −80.98494 | 3.030 | 1.91149 | 36.85 | 0.57837 |
| 19 | 46.44778 | 8.910 | 1.49700 | 81.54 | 0.53748 |
| 20 | −39.69266 | 2.401 | 1.51601 | 64.38 | 0.53517 |
| 21 | −91.70699 | 34.781 | | | |

TABLE 11

| Example 4 | |
|---|---|
| f | 35.642 |
| Bf | 34.781 |
| FNo. | 2.89 |
| 2ω (°) | 78.4 |

TABLE 12

Example 4

| Sn | 5 | 6 | 16 | 17 |
|---|---|---|---|---|
| KA  | 1.0000000E+00  | 1.0000000E+00  | 1.0000000E+00  | 1.0000000E+00 |
| A3  | 0.0000000E+00  | 0.0000000E+00  | 0.0000000E+00  | 0.0000000E+00 |
| A4  | 5.3401552E−06  | −1.6434892E−06 | −2.4649576E−06 | 1.1932980E−05 |
| A5  | 3.4823209E−09  | 6.8440705E−07  | −1.6863079E−07 | −1.3454293E−06 |
| A6  | 3.3459310E−09  | −5.8834120E−08 | 1.3063035E−09  | 1.8550949E−07 |
| A7  | 2.8880452E−10  | 9.8004507E−10  | 3.6563517E−09  | −8.7307260E−09 |
| A8  | −4.0610236E−11 | 4.7302920E−12  | −1.9601357E−10 | −3.6318575E−10 |
| A9  | −3.0639617E−12 | −3.2483883E−13 | −9.6544084E−12 | 5.8428152E−11 |
| A10 | −8.5449711E−14 | −2.3236705E−13 | 9.1451802E−13  | −1.2477178E−12 |
| A11 | 3.2670451E−15  | −4.6186349E−15 | 8.9903231E−15  | −8.9637154E−14 |
| A12 | −1.8246330E−16 | −2.8223096E−16 | −3.2331700E−16 | 3.3589664E−15 |
| A13 | 5.3310882E−17  | 8.4943904E−17  | −2.7500892E−17 | −1.4240688E−17 |
| A14 | 2.2140009E−19  | 1.0854733E−18  | −1.9321880E−18 | 9.8939011E−18 |
| A15 | −1.7422626E−19 | −2.0770999E−20 | 6.1443995E−20  | −2.4790639E−20 |
| A16 | 2.8449625E−20  | −5.3538616E−21 | 1.2218962E−20  | −1.4729644E−20 |
| A17 | −1.2085832E−21 | 6.8416807E−22  | −7.9736015E−22 | −7.5690734E−22 |
| A18 | −2.8987972E−23 | −4.7323047E−23 | −3.3927899E−23 | −1.0874565E−23 |
| A19 | −9.4490250E−25 | −3.5259595E−24 | −6.1458408E−25 | −3.5862672E−24 |
| A20 | 8.1812865E−26  | 1.3875132E−25  | 2.0088576E−25  | 3.2275209E−25 |

EXAMPLE 5

Figure 5:
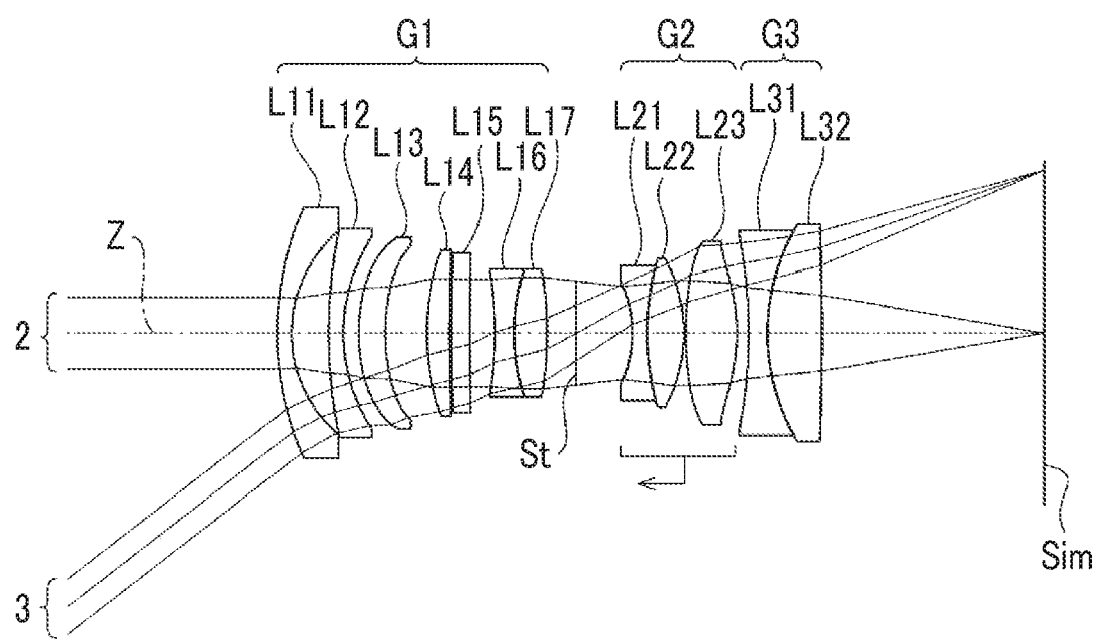
FIG. 5 is a cross-sectional view illustrating a configuration of an imaging lens of Example 5 of the present invention.
Figure 10:
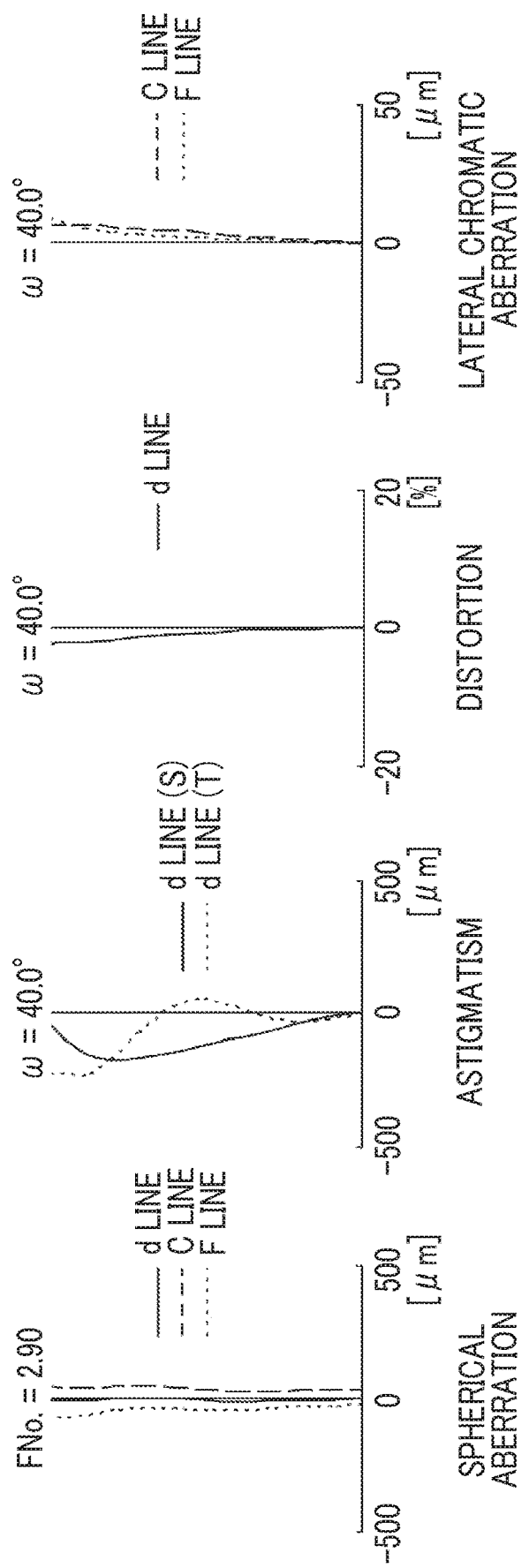
FIG. 10 is a diagram of aberrations of the imaging lens of Example 5 of the present invention.

FIG. 5 is a cross-sectional view illustrating a configuration of an imaging lens of Example 5. The imaging lens of Example 5 has the same composition as the outline of the imaging lens of Example 1. The first lens group G1 consists of seven lenses L11 to L17 in order from the object side to the image side, the second lens group G2 consists of three lenses L21 to L23 in order from the object side to the image side, and the third lens group G3 consists of two lenses L31 to L32 in order from the object side to the image side. Table 13 shows basic lens data of the imaging lens of Example 5, Table 14 shows specification, Table 15 shows aspheric coefficients, and FIG. 10 illustrates aberration diagrams in a state where the object at infinity is in focus.

TABLE 13

Example 5

| Sn | R | D | Nd | vd | θgF |
|---|---|---|---|---|---|
| 1  | 52.83846  | 2.400 | 1.95906 | 17.47 | 0.65993 |
| 2  | 22.99612  | 6.080 |         |       |         |
| 3  | 90.08455  | 2.400 | 1.43875 | 94.66 | 0.53402 |
| 4  | 30.74659  | 2.500 |         |       |         |
| *5 | 33.43633  | 4.380 | 1.58313 | 59.42 | 0.54109 |
| *6 | 38.88076  | 6.800 |         |       |         |
| 7  | 42.60904  | 3.750 | 2.00272 | 19.32 | 0.64514 |
| 8  | 350.14048 | 0.300 |         |       |         |

TABLE 13-continued

Example 5

| Sn | R | D | Nd | vd | θgF |
|---|---|---|---|---|---|
| 9     | 365.65836  | 3.000  | 2.00272 | 19.32 | 0.64514 |
| 10    | 431.91144  | 4.002  |         |       |         |
| 11    | −61.01515  | 3.180  | 1.59551 | 39.23 | 0.58053 |
| 12    | 35.84461   | 5.400  | 1.87070 | 40.73 | 0.56825 |
| 13    | −66.13986  | 4.740  |         |       |         |
| 14(St)| ∞          | 9.300  |         |       |         |
| 15    | −20.28161  | 2.400  | 1.71736 | 29.51 | 0.60259 |
| 16    | 45.25872   | 6.010  | 1.62041 | 60.37 | 0.54240 |
| 17    | −27.24681  | 0.300  |         |       |         |
| *18   | 58.91185   | 8.500  | 1.58313 | 59.42 | 0.54109 |
| *19   | −30.14228  | 1.890  |         |       |         |
| 20    | −85.42229  | 3.030  | 1.67300 | 38.15 | 0.57545 |
| 21    | 36.32136   | 8.910  | 1.55032 | 75.50 | 0.54001 |
| 22    | −569.05279 | 36.245 |         |       |         |

TABLE 14

Example 5

| f | 35.114 |
|---|---|
| Bf | 36.245 |
| FNo. | 2.90 |
| 2ω (°) | 80.0 |

TABLE 15

Example 5

| Sn | 5 | 6 | 18 | 19 |
|---|---|---|---|---|
| KA | 1.0000000E+00  | 1.0000000E+00  | 1.0000000E+00  | 1.0000000E+00 |
| A3 | 0.0000000E+00  | 0.0000000E+00  | 0.0000000E+00  | 0.0000000E+00 |
| A4 | 1.9176771E−05  | 9.5061448E−06  | 7.4013388E−07  | 1.8422059E−05 |
| A5 | −6.4126900E−07 | 9.7144330E−07  | 2.8562456E−08  | −1.5142404E−06 |
| A6 | 6.6426287E−08  | −7.7505364E−08 | −4.7473348E−09 | 2.0738192E−07 |
| A7 | 9.7482444E−10  | 4.9366139E−09  | 4.2470415E−09  | −9.3115008E−09 |
| A8 | −9.0174929E−11 | 2.3163374E−11  | −9.6280235E−11 | −3.1743091E−10 |

TABLE 15-continued

Example 5

| | Sn | | | |
|---|---|---|---|---|
| | 5 | 6 | 18 | 19 |
| A9 | −7.1980032E−12 | −4.2509925E−12 | −6.6195470E−12 | 6.1816706E−11 |
| A10 | 2.1360896E−13 | −1.5733689E−13 | 7.3521817E−13 | −1.2066984E−12 |
| A11 | 2.2501599E−14 | −3.3866563E−15 | −7.8600011E−15 | −7.2783819E−14 |
| A12 | 1.2429492E−15 | 1.2189464E−15 | −5.4154482E−16 | 4.21673166E−15 |
| A13 | 8.8546258E−17 | 6.6411963E−17 | −8.9095134E−18 | −3.2075539E−17 |
| A14 | −2.2935403E−18 | 1.3330739E−17 | −5.3388062E−18 | 2.4954179E−18 |
| A15 | −5.7278053E−19 | −8.3423563E−20 | 2.8984542E−19 | −1.5717942E−19 |
| A16 | 1.7427104E−20 | 1.4036937E−21 | 4.7102141E−20 | −1.1918632E−20 |
| A17 | −7.6724557E−22 | −1.3224077E−21 | −7.2423023E−22 | −5.5991643E−22 |
| A18 | −4.0595991E−23 | −3.0762347E−22 | −6.4423422E−23 | 3.5942709E−23 |
| A19 | 2.1065506E−24 | −1.9649765E−23 | −8.1478897E−25 | −2.2072303E−24 |
| A20 | 3.1320082E−25 | 2.7677757E−24 | 5.7657128E−26 | 5.1858805E−25 |

Table 16 shows values corresponding to Conditional Expressions (1) to (4) of the imaging lenses of Examples 1 to 5. In Examples 1 to 5, the d line is set as the reference wavelength. Table 16 shows the values based on the d line.

TABLE 16

| Expression number | | Example 1 | Example 2 | Example 3 | Example 4 | Example 5 |
|---|---|---|---|---|---|---|
| (1) | f1/f2 | 1.448 | 1.540 | 1.313 | 1.353 | 1.403 |
| (2) | $\frac{\theta gfPL - \theta gfNL}{vPL - vNL}$ | −0.00020 | −0.00058 | −0.00112 | −0.00026 | −0.00020 |
| (3) | θgfPH − θgfNH | −0.015 | −0.015 | −0.039 | −0.015 | −0.015 |
| (4) | TTL/Bf | 3.433 | 3.396 | 4.633 | 3.617 | 3.463 |

As can be seen from the above data, the imaging lenses of Examples 1 to 5 are miniaturized, the total angle of view is configured in the range of 75 degrees or more and 90 degrees or less so as to have a relatively wide angle, and high optical performance is achieved by favorably correcting various aberrations including distortion and lateral chromatic aberration.

Figure 11:
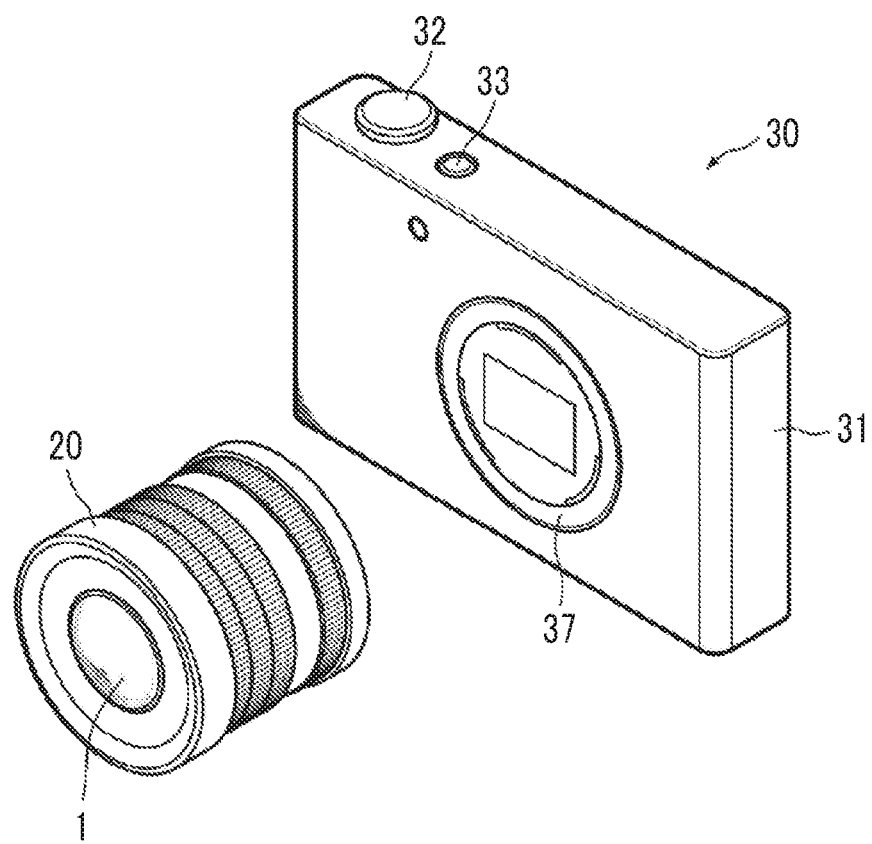
FIG. 11 is a perspective view of the front side of an imaging apparatus according to an embodiment of the present invention.
Figure 12:
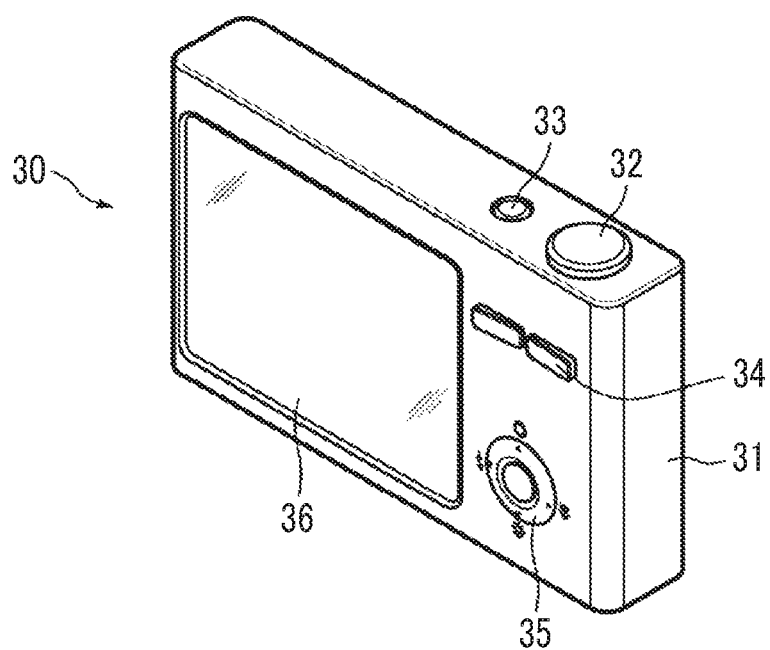
FIG. 12 is a perspective view of the rear side of the imaging apparatus according to the embodiment of the present invention.

Next, an imaging apparatus according to an embodiment of the present invention will be described. FIGS. 11 and 12 are external views of a camera 30 which is the imaging apparatus according to the embodiment of the present invention. FIG. 11 is a perspective view of the camera 30 in a case where viewed from the front side, and FIG. 12 is a perspective view of the camera 30 in a case where viewed from the rear side. The camera 30 is a mirrorless type digital camera in which an interchangeable lens 20 is attachably and detachably mounted. The interchangeable lens 20 is composed to include the imaging lens 1 according to the embodiment of the present invention which is housed in a lens barrel.

The camera 30 comprises a camera body 31, and a shutter button 32 and a power button 33 are provided on an upper surface of the camera body 31. Further, operation sections 34 and 35 and a display section 36 are provided on a rear surface of the camera body 31. The display section 36 displays a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a recording medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The recording medium records the generated image. The camera 30 is able to capture a still image or a moving image by pressing the shutter button 32, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric coefficient of each lens are not limited to the values shown in the numerical examples, and different values may be used therefor.

The imaging apparatus according to the embodiment of the present invention is not also limited to the above mentioned examples. For the imaging apparatus, various modes such as cameras other than the mirrorless type, film cameras, video cameras and the like can be employed.

What is claimed is:

1. An imaging lens consisting of, in order from an object side to an image side:

a first lens group having a positive refractive power;

a stop;

a second lens group having a positive refractive power; and a third lens group having a negative refractive power, wherein lenses arranged first and second from the object side in the first lens group are both single lenses having convex surfaces toward the object side and negative refractive powers, wherein the first lens group includes at least one positive lens, wherein the second lens group includes a cemented lens in which one negative lens and one positive lens are cemented and the second lens group only moves along an optical axis during focusing from an object at infinity to a closest object, and wherein assuming that a focal length of the first lens group is f1 and a focal length of the second lens group is f2, Conditional Expression (1) is satisfied, $$0.7 < f1/f2 < 2 \qquad (1).$$

2. The imaging lens according to claim 1, wherein, assuming that a partial dispersion ratio between a g line and a F line of a positive lens having the lowest refractive index in the first lens group is θgfPL, a partial dispersion ratio between the g line and the F line of a negative lens having the lowest refractive index in the first lens group is θgfNL, an Abbe number based on a d line of the positive lens having the lowest refractive index in the first lens group is vPL, and an Abbe number based on the d line of the negative lens having the lowest refractive index in the first lens group is vNL, Conditional Expression (2) is satisfied, $$-0.015 < (\theta gfPL - \theta gfNL)/(vPL - vNL) < 0 \qquad (2).$$

3. The imaging lens according to claim 1, wherein, assuming that a partial dispersion ratio between a g line and a F line of a positive lens having the highest refractive index in the first lens group is θgfPH, and a partial dispersion ratio between the g line and the F line of a negative lens having the highest refractive index in the first lens group is θgfNH, Conditional Expression (3) is satisfied, $$-0.05 < \theta gfPH - \theta gfNH < 0 \qquad (3).$$

4. The imaging lens according to claim 1, wherein, assuming that, in a state of focusing on an object at infinity, a back focus of the imaging lens at an air equivalent distance is Bf and a sum of a distance on an optical axis from a lens surface closest to the object side to a lens surface closest to the image side and Bf is TTL, Conditional Expression (4) is satisfied, $$2.5 < TTL/Bf < 5.5 \qquad (4).$$

5. The imaging lens according to claim 1, wherein the lenses in the first lens group arranged first and second from the object side are both meniscus lenses, and a single lens having a positive refractive power is arranged on the image side of the meniscus lens in the first lens group arranged second from the object side to be continuous from the meniscus lens, and wherein, in the first lens group a cemented lens, in which at least one negative lens and at least one positive lens are cemented and a lens surface closest to the image side is convex, is arranged closest to the image side.

6. The imaging lens according to claim 1, wherein the second lens group includes, continuously in order from the object side to the image side, the cemented lens in which a biconcave lens and a biconvex lens are cemented in order from the object side and a biconvex single lens.

7. The imaging lens according to claim 1, wherein the third lens group includes at least one negative lens and at least one positive lens.

8. The imaging lens according to claim 1, wherein a lens surface in the third lens group closest to the object side is a concave surface and a lens surface in the third lens group closest to the image side is a convex surface.

9. The imaging lens according to claim 1, wherein the first lens group consists of six or seven lenses.

10. The imaging lens according to claim 1, wherein the second lens group consists of three lenses.

11. The imaging lens according to claim 1, wherein the third lens group consists of two or three lenses.

12. The imaging lens according to claim 1, wherein Conditional Expression (1-1) is satisfied, $$1 < f1/f2 < 1.8 \qquad (1\text{-}1).$$

13. The imaging lens according to claim 2, wherein Conditional Expression (2-1) is satisfied, $$-0.01 < (\theta gfPL - \theta gfNL)/vPL - vNL) < 0 \qquad (2\text{-}1).$$

14. The imaging lens according to claim 3, wherein Conditional Expression (3-1) is satisfied, $$-0.04 < \theta gfPH - \theta gfNH < 0 \qquad (3\text{-}1).$$

15. The imaging lens according to claim 4, wherein Conditional Expression (4-1) is satisfied, $$3 < TTL/Bf < 4.8 \qquad (4\text{-}1).$$

16. An imaging apparatus comprising the imaging lens according to claim 1.

* * * * *